United States Patent
Zampiello

(10) Patent No.: US 10,645,222 B2
(45) Date of Patent: May 5, 2020

(54) 9-1-1 CALL ROUTING

(71) Applicant: AT&T Intellectual Property I, L.P., Atlanta, GA (US)

(72) Inventor: Geoffrey R. Zampiello, Norwalk, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 236 days.

(21) Appl. No.: 14/955,591

(22) Filed: Dec. 1, 2015

(65) Prior Publication Data

US 2017/0155764 A1 Jun. 1, 2017

(51) Int. Cl.
*H04L 12/24* (2006.01)
*H04M 3/51* (2006.01)
*H04L 29/06* (2006.01)
*H04L 12/853* (2013.01)

(52) U.S. Cl.
CPC ....... *H04M 3/5116* (2013.01); *H04L 47/2416* (2013.01); *H04L 65/105* (2013.01); *H04L 65/1006* (2013.01); *H04L 65/1046* (2013.01); *H04L 65/1069* (2013.01)

(58) Field of Classification Search
CPC .............. H04M 3/5116; H04L 65/1006; H04L 47/2416; H04L 65/1046; H04L 65/105; H04L 65/1069
USPC ......................................................... 709/217
See application file for complete search history.

(56) References Cited

U.S. PATENT DOCUMENTS

| 7,881,199 B2 | 2/2011 | Krstulich | |
|---|---|---|---|
| 8,411,672 B2 | 4/2013 | Baum et al. | |
| 8,554,168 B1 | 10/2013 | Bonner et al. | |
| 8,559,601 B2 | 10/2013 | Coster et al. | |
| 8,774,171 B2 | 7/2014 | Mitchell | |
| 8,811,573 B2 | 8/2014 | Killian et al. | |
| 9,055,550 B1 | 6/2015 | Livingood | |
| 2006/0250962 A1* | 11/2006 | Chikamatsu | H04L 47/10 370/235 |
| 2007/0153798 A1* | 7/2007 | Krstulich | H04L 12/2898 370/392 |

(Continued)

OTHER PUBLICATIONS

Peter et al., "One Tunnel is (Often) Enough," Proceedings of the 2014 ACM Conference on SIGGCOMM, Aug. 17-22, 2014, pp. 99-110, ACM.

*Primary Examiner* — Moustafa M Meky
*Assistant Examiner* — Elizabeth Kassa
(74) *Attorney, Agent, or Firm* — Hartman & Citrin LLC

(57) ABSTRACT

A provider edge router for handling 9-1-1 call routing is disclosed herein. The provider edge router can receive an Internet protocol ("IP") call and can determine whether the IP call is associated with a 9-1-1 service. If so, the provider edge router can set a priority for the IP call to be routed to a 9-1-1 edge router. The IP call, in some embodiments, includes a session initiation protocol ("SIP") call. In some embodiments, the provider edge router includes one or more dedicated 9-1-1 outbound interfaces through which the provider edge router routes the IP call to the 9-1-1 edge router or multiple 9-1-1 edge routers. In some embodiments, the priority can be set in a differentiated services field ("DSF") that includes a differentiated services codepoint ("DSCP") marking that cannot be removed by any router along a routing path for the IP call.

17 Claims, 6 Drawing Sheets

(56) References Cited

U.S. PATENT DOCUMENTS

| | | | |
|---|---|---|---|
| 2008/0013523 A1* | 1/2008 | Nambakkam | H04M 7/0075 370/352 |
| 2008/0090546 A1* | 4/2008 | Dickinson | H04M 3/5116 455/404.1 |
| 2008/0112544 A1* | 5/2008 | Kim | H04M 3/51 379/45 |
| 2009/0086932 A1* | 4/2009 | Ray | H04W 4/90 379/45 |
| 2010/0233991 A1* | 9/2010 | Crawford | H04W 4/90 455/404.1 |
| 2010/0271982 A1* | 10/2010 | Baum | H04L 29/12018 370/259 |
| 2010/0272242 A1* | 10/2010 | Croy | H04M 3/42348 379/45 |
| 2011/0026687 A1* | 2/2011 | Smelyansky | H04W 76/007 379/45 |
| 2011/0263219 A1* | 10/2011 | Hasenfang | H04L 12/66 455/404.2 |
| 2012/0250835 A1* | 10/2012 | Killian | H04M 3/323 379/45 |
| 2012/0320912 A1 | 12/2012 | Estrada et al. | |
| 2014/0269511 A1* | 9/2014 | Mitchell | H04L 12/66 370/328 |
| 2014/0295786 A1* | 10/2014 | Maier | H04W 4/70 455/404.2 |
| 2015/0029941 A1 | 1/2015 | Dickinson et al. | |
| 2015/0381820 A1* | 12/2015 | Ting | H04M 7/0075 370/259 |

\* cited by examiner

9-1-1 CALL ROUTING

BACKGROUND

In the United States, the telephone number "9-1-1" is the designated universal emergency number for requesting emergency assistance. "9-1-1" provides fast and easy access to emergency services via a public safety answering point ("PSAP"). A PSAP is a call center responsible for answering calls to an emergency telephone number and for dispatching emergency services such as police, firefighters, and ambulance services.

PSAPs can identify caller locations for landline calls and mobile calls. For landline calls, the PSAP utilizes the name, address, and telephone number associated with the landline telephone used to make the call. For mobile calls, the PSAP utilizes the address of the base station serving the mobile device that originated the call, telephone number, and estimated location of the mobile device.

The 9-1-1 service is evolving further as communications technology transition to Internet Protocol ("IP") networks. The next generation of 9-1-1 service will allow people to make emergency calls via voice, text, or video from any IP communications device. The new 9-1-1 infrastructure will support national internetworking of 9-1-1 services, including transfer of emergency calls to other PSAPs.

Currently, IP infrastructure is geographically dispersed. For this reason, a providers' 9-1-1 infrastructure might not be handled locally or as locally as possible. This can lead to call routing problems and 9-1-1 system troubles if the IP 9-1-1 calls are not handled in a more local manner.

SUMMARY

Concepts and technologies disclosed herein are directed to 9-1-1 call routing. According to one aspect of the concepts and technologies disclosed herein, a provider edge router includes a processor and a memory that stores instructions that, when executed by the processor, cause the processor to perform operations. The provider edge router can receive an IP call from an IP calling device. The provider edge router can analyze the IP call to determine whether the IP call is associated with a 9-1-1 service. In response to determining that the IP call is associated with the 9-1-1 service, the provider edge router can set a priority for the IP call to be routed to a 9-1-1 edge router that provides access to one or more PSAPs. The provider edge router also can route the IP call to the 9-1-1 edge router that, in turn, routes the IP call to the appropriate PSAP. In some embodiments, the IP call is a session initiation protocol ("SIP") call.

In some embodiments, the provider edge router includes a plurality of outbound interfaces, including one or more dedicated 9-1-1 outbound interfaces each providing an interface to one or more 9-1-1 edge routers and one or more interfaces to provider (also known as backbone) routers that can be utilized for routing, in part, non-9-1-1 calls.

In some embodiments, the provider edge router can set the priority for an IP call to be routed to the 9-1-1 edge router via a differentiated services field ("DSF") such that IP packets associated with the IP call are prioritized for 9-1-1 service. The DSF can include a differentiated services codepoint ("DSCP") that cannot be removed or manipulated in any way by any router during routing of the IP call to the 9-1-1 edge router. In this manner, any intermediary routers, switches, and/or other networking components that handle, at least in part, the IP call during a path towards a destination PSAP cannot improperly route the IP call.

In some embodiments, the provider edge router can assign a new subnet to an IP call that has been inspected so that the provider edge router can perform a network address translation ("NAT") function back to a source IP address of the IP call. The provider routers and/or other next hop routers can then provide specialized treatment based upon the prefix of the newly-assigned IP address.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies disclosed herein are directed to 9-1-1 call routing. The concepts and technologies disclosed herein strengthen the IP 9-1-1 infrastructure through the implementation of new router software on network edge routers that interrogate IP and session initiation protocol ("SIP") traffic. The routing software can interrogate all IP and SIP calls to determine whether the IP and SIP calls are associated with 9-1-1 service. If the routing software determines that a call is associated with 9-1-1 service, the routing software sets a data stream to a 9-1-1 edge router utilizing a priority-based differentiated services code point ("DSCP") that will not be dropped by any other router along a call path. The 9-1-1 call also can be anchored regionally in the event of statewide isolation.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
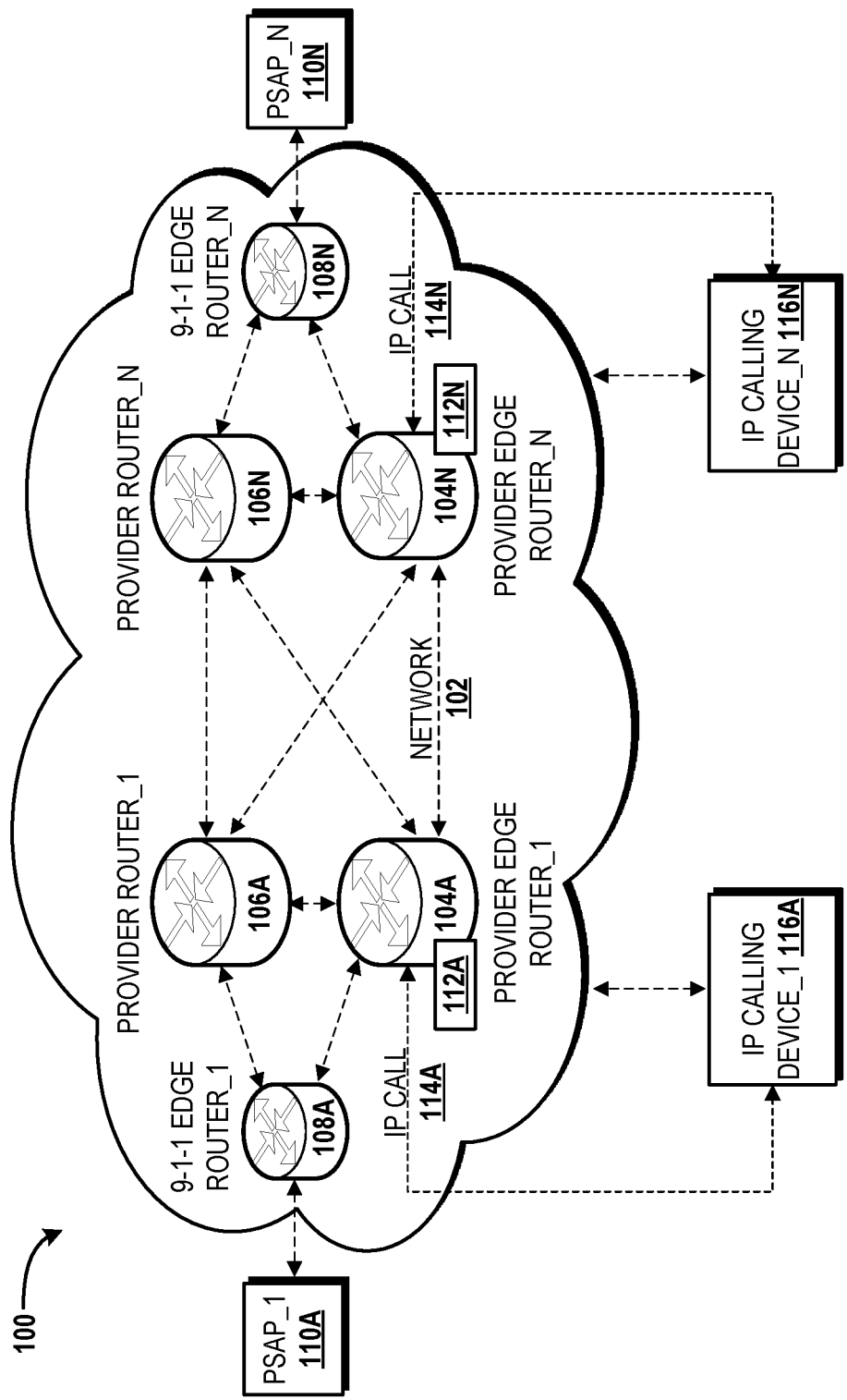
FIG. 1 is a block diagram illustrating aspects of an illustrative operating environment for various concepts disclosed herein.

Turning now to FIG. 1, a block diagram illustrating aspects of an operating environment 100 in which the concepts and technologies disclosed herein can be implemented will be described. The illustrated operating environment 100 includes a network 102. The network 102 can include one or more networks, including, for example, one or more radio access networks, one or more wired access networks, one or more backbone networks, one or more service provider networks, or some combination thereof.

The illustrated network 102 includes a plurality of provider edge routers 104A-104N (collectively, "provider edge routers 104," or in the singular, "provider edge router 104") located at the edge of the network 102. The provider edge routers 104 are routers between a network service provider's service area and one or more areas serviced by other network service providers. The network service provider can be or can include an Internet service provider, a voice over IP ("VoIP") service provider, a telecommunications service provider, or the like.

The provider edge routers 104 can be configured to utilize one or more routing protocols. The provider edge routers 104 can utilize border gateway protocol ("BGP") for communications between two or more of the provider edge routers 104. The provider edge routers 104 can utilize open shortest path first ("OSPF") for communications between the provider edge routers 104 and one or more customer edge routers (not shown). The provider edge routers 104 can utilize multiprotocol label switching ("MPLS") for communications between the provider edge routers 104 and one or more provider routers 106A-106N. BGP, OSPF, and MPLS are well-known routing protocols, and for this reason, additional details are not provided herein since those skilled in the art will understand the functionality provided by these protocols and the applicability thereof to the concepts and technologies disclosed herein.

In the illustrated network 102, the provider edge routers 104, in turn, are in communication with the provider routers 106A-106N (collectively, "provider routers 106," or in the singular, "provider router 106"; also known as "backbone router(s)"). The provider routers 106 are label switch routers that function as transit routers within the core of the network 102. The provider routers 106 can utilize MPLS for communications with the provider edge routers 104.

The provider edge routers 104, in turn, also are in communication with a plurality of 9-1-1 edge routers 108A-108N (collectively, "9-1-1 edge routers 108," or in the singular, "9-1-1 edge router 108"; also known as "9-1-1 IP border router(s)"). The 9-1-1 edge routers 108 can be configured to utilize one or more routing protocols. The provider edge routers 104 can utilize BGP for communications between two or more of the 9-1-1 provider edge routers 108 and/or with one or more of the provider edge routers 104. The 9-1-1 provider edge routers 108 can utilize open shortest path first ("OSPF") for communications between the 9-1-1 provider edge routers 108 and one or more PSAPs 110A-110N). The 9-1-1 provider edge routers 108 can utilize MPLS for communications between the provider edge routers 104 and one or more of the provider routers 106.

The provider edge routers 104 each include a 9-1-1 module 112A-112N, respectively (collectively, "9-1-1 modules 112," or in the singular, "9-1-1 module 112"). The 9-1-1 module 112, in some embodiments, can be a standalone software module. The 9-1-1 module 112, in some other embodiments, can be a software module combined with at least one other software module, such as routing software that implements the aforementioned routing protocols. The 9-1-1 module 112, in some other embodiments, can be provided as part of an operating system of the provider edge router 104 (best shown in FIG. 2). The 9-1-1 module 112 can include instructions that are executable by one or more processors (also best shown in FIG. 2) of the provider edge router 104 to perform operations described herein.

In particular, the 9-1-1 modules 112 can interrogate IP calls 114A-114N (collectively, "IP calls 114," or in the singular, "IP call 114"), originating from IP calling devices 116A-116N, respectively, to better route any of the IP calls 114 designated for 9-1-1 service to a 9-1-1 endpoint, such as one of the PSAPs 110A-110N (collectively, "PSAPs 110," or in the singular, "PSAP 110"), that is more local to the IP calling device 116 than a current endpoint to which the IP 9-1-1 call would be routed without implementation of the concepts and technologies disclosed herein. In some embodiments, the IP call is a session initiation protocol ("SIP") call. The IP calling devices 116 can include any computing device configured to provide IP calling capabilities. The IP calling device 116 can include, for example, a mobile device (e.g., a smartphone, personal digital assistant ("PDA"), or tablet), a computer, a dedicated VoIP phone, or the like.

The 9-1-1 module 112 can set the priority for the IP call 114 to be routed to the 9-1-1 edge router 108 via a differentiated services field ("DSF") such that IP packets associated with the IP call 114 are prioritized for 9-1-1 service. The DSF can include a differentiated services codepoint ("DSCP") that cannot be removed or manipulated in any way by any router during routing of the IP call 114 to the 9-1-1 edge router 108. In this manner, any intermediary routers, switches, and/or other networking components that handle, at least in part, the IP call 114 along a call path towards a destination one of the PSAPs 110 cannot improperly route the IP call 114. DSCP is a field in an IP packet that enables different levels of service to be assigned to network traffic. This is achieved by marking each packet with a DSCP and appropriately routing the packet to the corresponding level of service. In context of the concepts and technologies disclosed herein, the marking can identify the level of service as priority and 9-1-1 only. DSF and DSCP are defined greater in Internet Engineering Task Force ("IETF") Request for Comments ("RFC") 2474 and other RFCs. As such, additional details in this regard are not provided herein.

In some embodiments, the provider edge router 104 can assign a new subnet to the IP call 114 that has been inspected so that the provider edge router 104 can perform a NAT function back to a source IP address (e.g., a source IP address) of the IP call 114. The provider routers 106 and/or other next hop routers can then provide specialized treatment based upon the prefix of the newly-assigned IP address.

Figure 2:
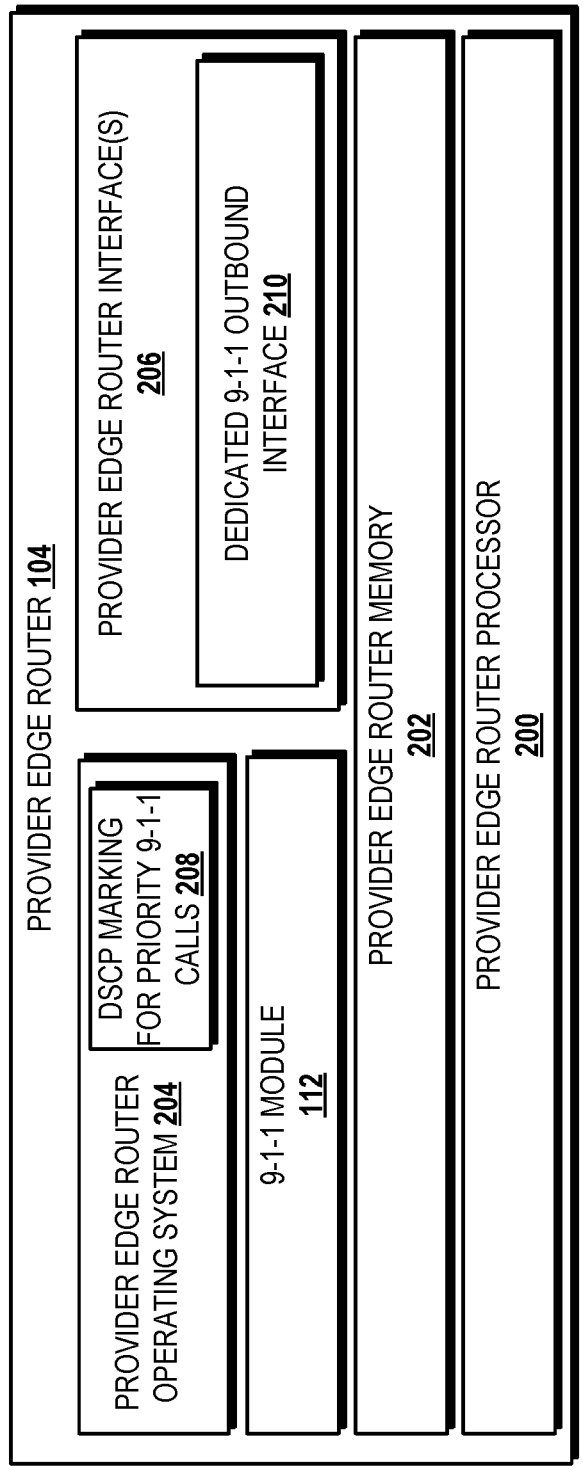
FIG. 2 is a block diagram illustrating aspects of a provider edge router, according to an illustrative embodiment of the concepts and technologies disclosed herein.

Turning now to FIG. 2, a block diagram illustrating aspects of the provider edge router 104 will be described, according to an illustrative embodiment of the concepts and technologies disclosed herein. The illustrated provider edge router 104 includes a provider edge router processor 200, a provider edge router memory 202, a provider edge router operating system 204, and one or more provider edge router interfaces 206.

The provider edge router processor 200 can include one or more hardware components that perform computations to calculate routes, process data, and/or to execute computer-executable instructions of one or more application programs (e.g., an application program that includes the 9-1-1 module 112 or the 9-1-1 module 112 implemented as a standalone software module), one or more operating systems (e.g., the provider edge router operating system 204), and/or other software. The provider edge router processor 200 can include one or more central processing units ("CPUs") configured with one or more processing cores. The provider edge router processor 200 can include one or more graphics processing units ("GPUs") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the provider edge router processor 200 can include one or more discrete GPUs. In some other embodiments, the provider edge router processor 200 can include CPU and GPU components that are configured in accordance with a co-processing CPU/GPU computing model, wherein the sequential part of an application executes on the CPU and the computationally-intensive part is accelerated by the GPU. The provider edge router processor 200 can include one or more field-programmable gate arrays ("FPGAs"). The provider edge router processor 200 can include one or more system-on-chip ("SoC") components along with one or more other components, including, for example, the provider edge router memory 202, and/or one or more of the other components of the provider edge router 104 such as the provider edge router interface(s) 206. In some embodiments, the provider edge router processor 200 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The provider edge router processor 200 can be or can include one or more hardware components architected in accordance with an ARM architecture, available for license from ARM HOLDINGS of Cambridge, United Kingdom. Alternatively, the provider edge router processor 200 can be or can include one or more hardware components architected in accordance with an x86 architecture, such an architecture available from INTEL CORPORATION of Mountain View, Calif., and others. Those skilled in the art will appreciate the implementation of the provider edge router processor 200 can utilize various computation architectures, and as such, provider edge router processor 200 should not be construed as being limited to any particular computation architecture or combination of computation architectures, including those explicitly disclosed herein.

The provider edge router memory 202 can include one or more hardware components that perform storage operations, including temporary and/or permanent storage operations. In some embodiments, the provider edge router memory 202 can include volatile and/or non-volatile memory implemented in any method or technology for storage of information such as computer-readable instructions, data structures, program modules (e.g., the 9-1-1 module 112), provider edge router operating system 204, and/or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the provider edge router processor 200.

The provider edge router operating system 204 can control the operation of the provider edge router 104. In some embodiments, the provider edge router operating system 204 includes the functionality of the 9-1-1 module 112. The provider edge router operating system 204 can be executed by the provider edge router processor 200 to cause the provider edge router 104 to perform various operations described herein. In some embodiments, the provider edge router operating system 204 is or includes a proprietary operating system or an off-the-shelf operating system based upon UNIX, LINUX, WINDOWS OS from MICROSOFT CORPORATION, OS X available from APPLE INC., or the like.

The 9-1-1 module 112 can interrogate the IP calls 114 originating from the IP calling devices 116 to better route those of the IP calls 114 associated with 9-1-1 service and therefore destined for a 9-1-1 endpoint, such as one of the PSAPs 110, that is more local to the originating IP calling device 116 than a current endpoint to which the IP 9-1-1 call would otherwise be routed without implementation of the concepts and technologies disclosed herein. The 9-1-1 module 112 also can set a DSCP marking for priority 9-1-1 calls 208 on one or more dedicated 9-1-1 outbound interfaces 210 of the provider edge router interface(s) 206 so that the IP calls 114 determined to be associated with 9-1-1 service can be delivered with priority to the 9-1-1 edge routers 108 (best shown in FIG. 1). The DSCP marking for priority 9-1-1 calls 208 cannot be removed by another router, including, for example, one or more of the provider routers 106 and/or one or more of the 9-1-1 edge routers 108 (both best shown in FIG. 1), other routers or other switches (not illustrated).

The provider edge router interfaces 206 can provide BGP interfaces between the provider edge router 104 and one or more other provider edge routers 104. The provider edge router interfaces 206 can provide MPLS interfaces between the provider edge router 104 and one or more of the provider routers 106. The provider edge router interfaces 206 can include one or more dedicated 9-1-1 outbound interfaces 210 that allow for 9-1-1 usage only on the outbound link(s) to the 9-1-1 edge router 108 or the 9-1-1 edge router 108 to a time-division multiplexing ("TDM") trunk gateway. This allows the 9-1-1 module 112 to specially handle IP 9-1-1 calls in a specific manner and send the IP 9-1-1 calls out the dedicated 9-1-1 outbound interface 210 to the 9-1-1 edge router 108 tied to the PSAPs 110. In some embodiments, a second route or a third route to other 9-1-1 call centers (other than the PSAPs 110) can be utilized if the primary (i.e., initial target) facility was not available due to an overflow condition.

Figure 3:
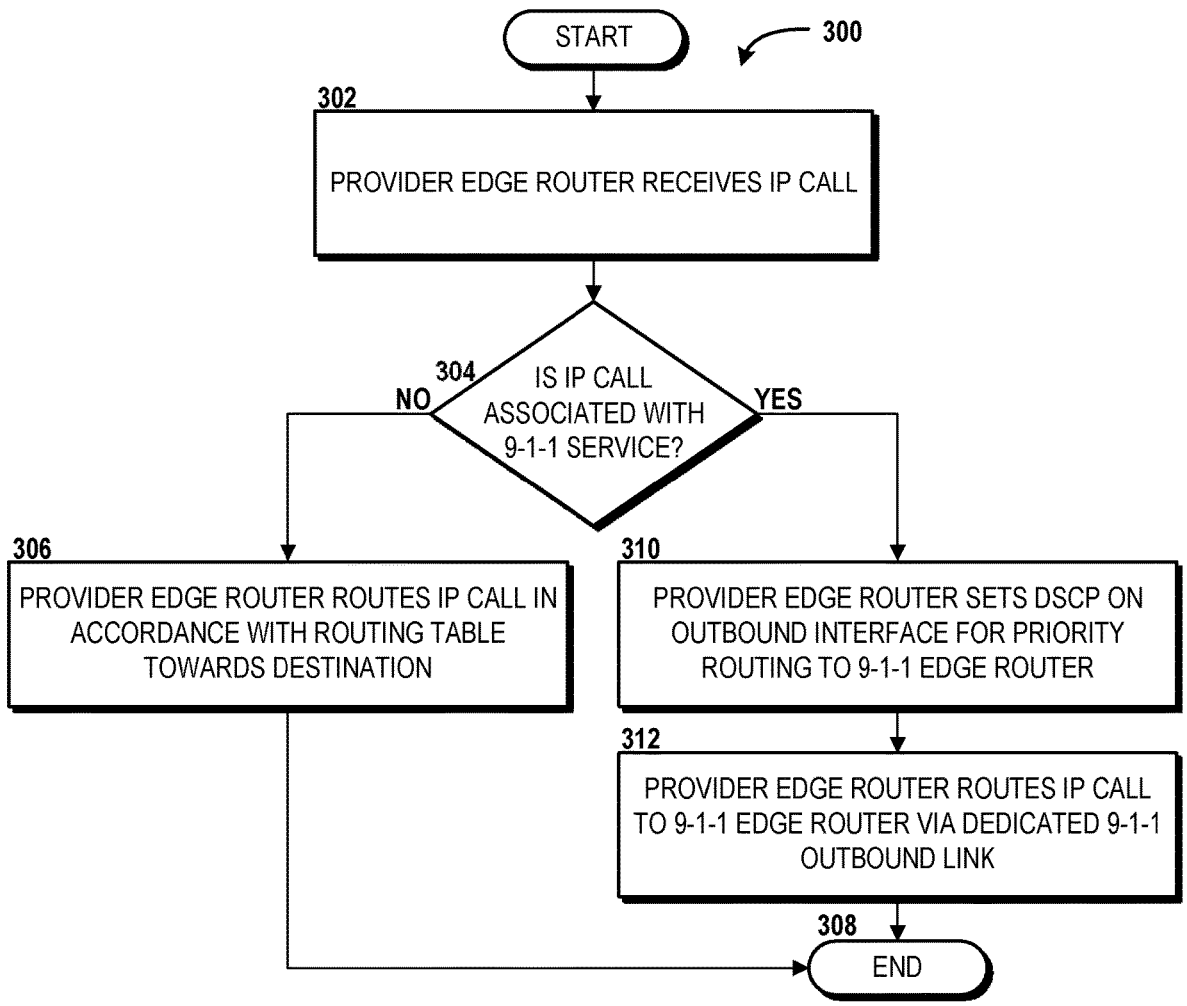
FIG. 3 is a flow diagram illustrating aspects of a method operating a provider edge router, according to an illustrative embodiment of the concepts and technologies disclosed herein.

Turning now to FIG. 3, aspects of a method 300 for operating the provider edge router 104 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, servers, routers, switches, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor such as the provider edge router processor 200 or other processing component(s) disclosed herein to perform operations. It should be understood that the performance of one or more operations may include operations executed by one or more virtual processors at the instructions of one or more of the aforementioned hardware processors.

The method 300 will be described with reference to FIG. 3 and further reference to FIGS. 1 and 2. The method 300 begins at operation 302, where the provider edge router 104 receives the IP call 114 from the IP calling device 116. From operation 302, the method 300 proceeds to operation 304, where the provider edge router 104 determines whether the IP call 114 is associated with 9-1-1 service. That is, the provider edge router 104 can analyze the IP call 114 to determine that the IP call 114 is directed to a destination number of "9-1-1."

If the provider edge router 104 determines, at operation 304, that the IP call 114 is not associated with the 9-1-1 service, the method 300 proceeds to operation 306, where the provider edge router 104 routes the IP call 114 in accordance with a routing table towards the destination. From operation 306, the method 300 proceeds to operation 308, where the method 300 ends.

If the provider edge router 104 determines, at operation 304, that the IP call 114 is associated with the 9-1-1 service, the method 300 proceeds to operation 310, where the provider edge router 104 sets the DSCP 208 on the dedicated 9-1-1 outbound interface 210 for priority routing to the 9-1-1 edge router 108. In some embodiments, the provider edge router 104 can assign a new subnet to the IP call 114 that has been inspected so that the provider edge router 104 can perform a NAT function back to a source IP address of the IP call 114. The provider routers 106 and/or other next hop routers can then provide specialized treatment based upon the prefix of the newly-assigned IP.

From operation 310, the method 300 proceeds to operation 312, where the provider edge router 104 routes the IP 9-1-1 call 112 to the 9-1-1 edge router 108 via a dedicated 9-1-1 outbound link provided, in part, by the dedicated 9-1-1 outbound interface 210. From operation 312, the method 300 proceeds to operation 308, where the method 300 ends.

Figure 4:
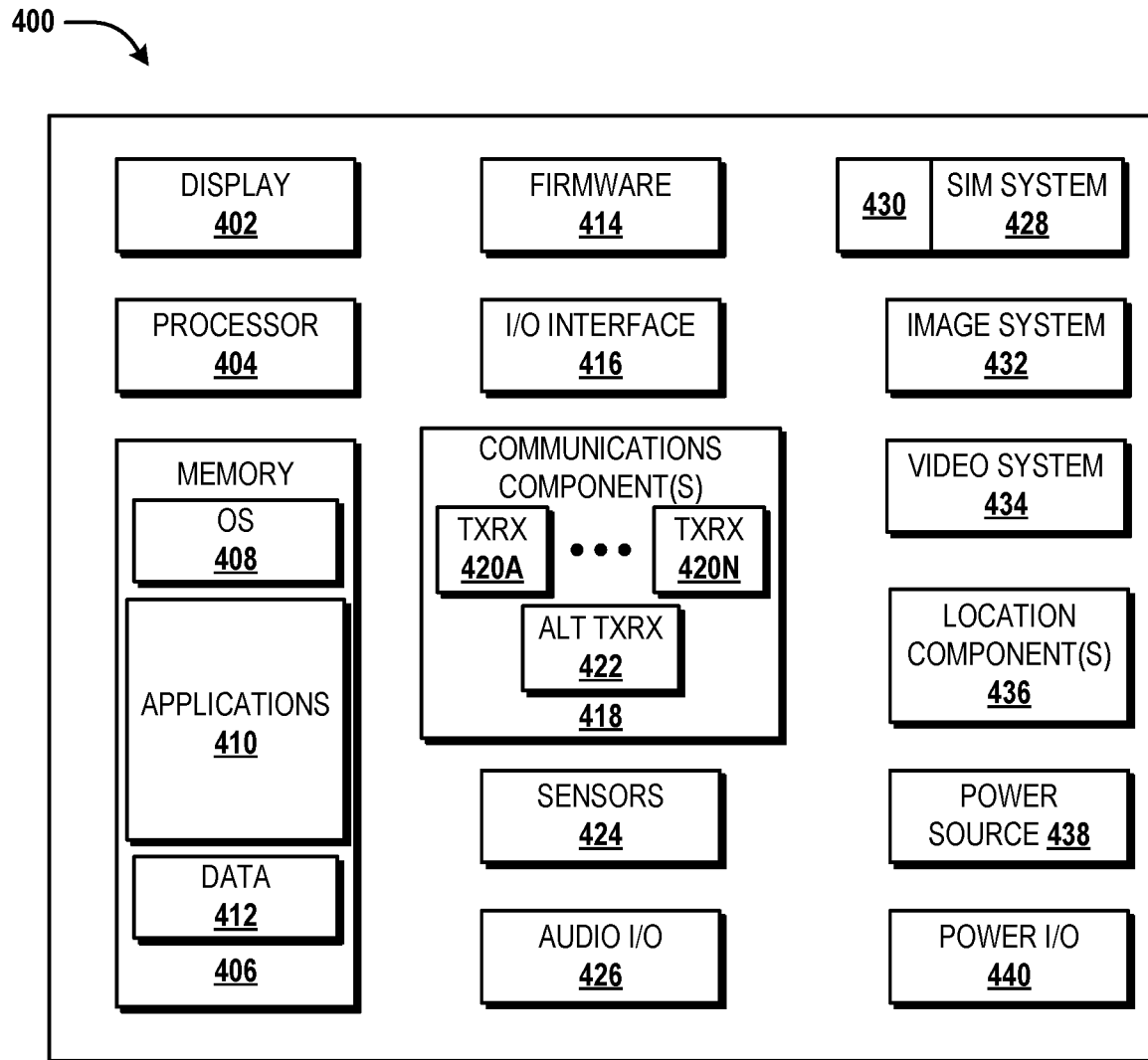
FIG. 4 is a block diagram illustrating an example mobile device capable of implementing aspects of the embodiments disclosed herein.

Turning now to FIG. 4, an illustrative mobile device 400 and components thereof will be described. In some embodiments, the IP calling device 114 is configured the same as or similar to the mobile device 400. While connections are not shown between the various components illustrated in FIG. 4, it should be understood that some, none, or all of the components illustrated in FIG. 4 can be configured to interact with one other to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in a memory 406, or the like. In some embodiments, the applications 410 also can include a user interface ("UP") application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in dialing telephone numbers, entering content, viewing account information, answering/initiating calls, entering/deleting data, entering and setting user IDs and passwords for device access, configuring settings, manipulating address book content and/or settings, multimode interaction, interacting with other applications 410, and otherwise facilitating user interaction with the operating system 408, the applications 410, and/or other types or instances of data 412 that can be stored at the mobile device 400. According to various embodiments, the data 412 can include, for example, telephone dialer applications, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, user information, organization information, presence status information, user IDs, passwords, and application initiation (start-up) requests. In some embodiments, the I/O interface 416 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks such as one or more IP access networks and/or one or more circuit access networks, which might be included, for example, in the network 102. In some embodiments, other networks include networks that utilize non-cellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using Global System for Mobile communications ("GSM"), Code Division Multiple Access ("CDMA") ONE, CDMA2000, Long-Term Evolution ("LTE"), and various other 2G, 2.4G, 3G, 4G, and greater generation technology standards. Moreover, the communications component 418 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 418 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, orientation sensors, noise sensors, proximity sensors, or the like. As such, it should be understood that the sensors 424 can include, but are not limited to, accelerometers, magnetometers, gyroscopes, infrared sensors, noise sensors, microphones, combinations thereof, or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

Figure 5:
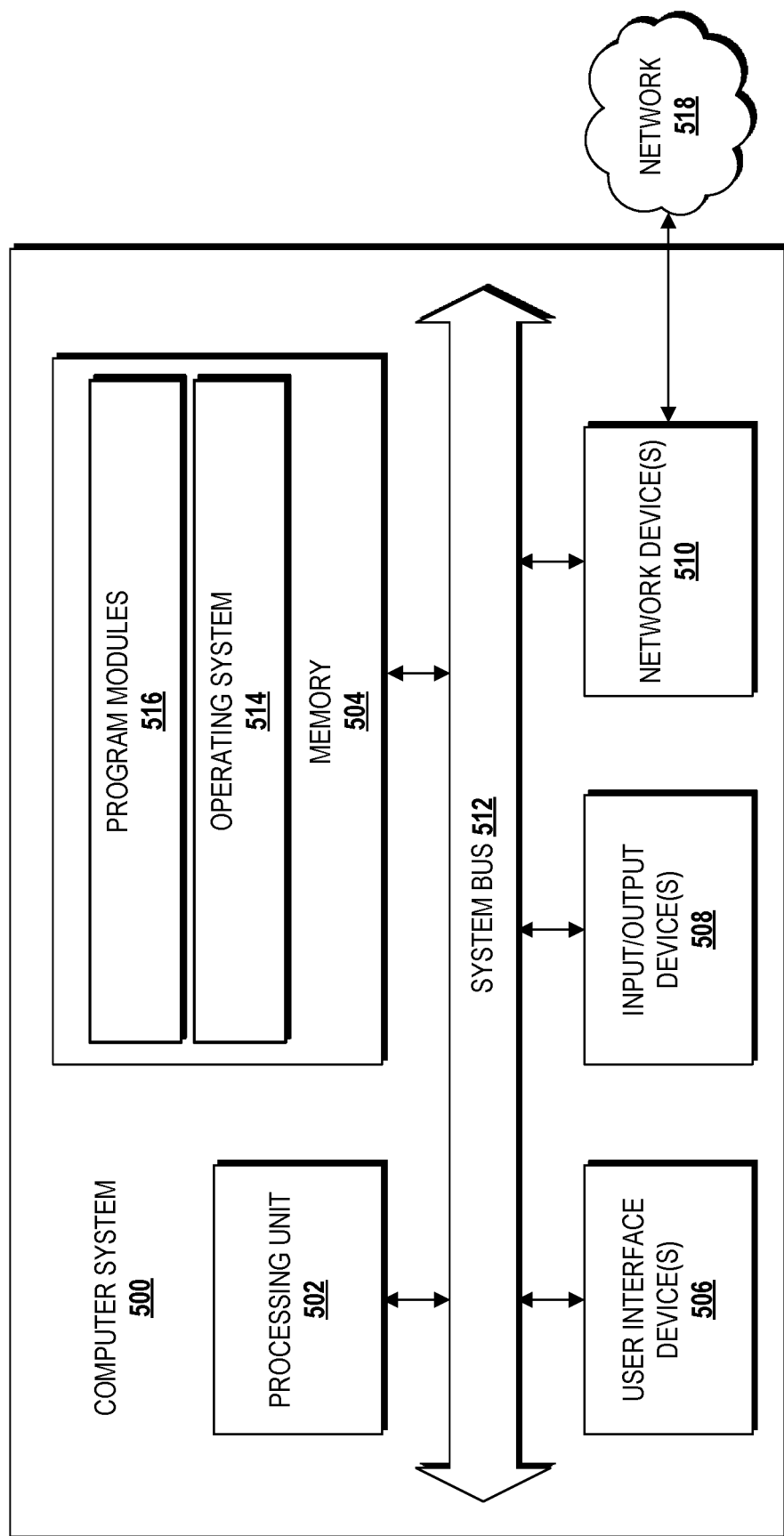
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. In some embodiments, the IP calling device and/or the provider edge router 104 can be configured, at least in part, like the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514 (e.g., the provider edge router operating system 204) and one or more program modules 516 (e.g., the 9-1-1 module 212). The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518, which can be or can include the network 102. Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be a wired network such as, but not limited to, a Wide Area Network ("WAN"), a wired Personal Area Network ("PAN"), or a wired Metropolitan Area Network ("MAN"). The network 518 may be any other network described herein.

Figure 6:
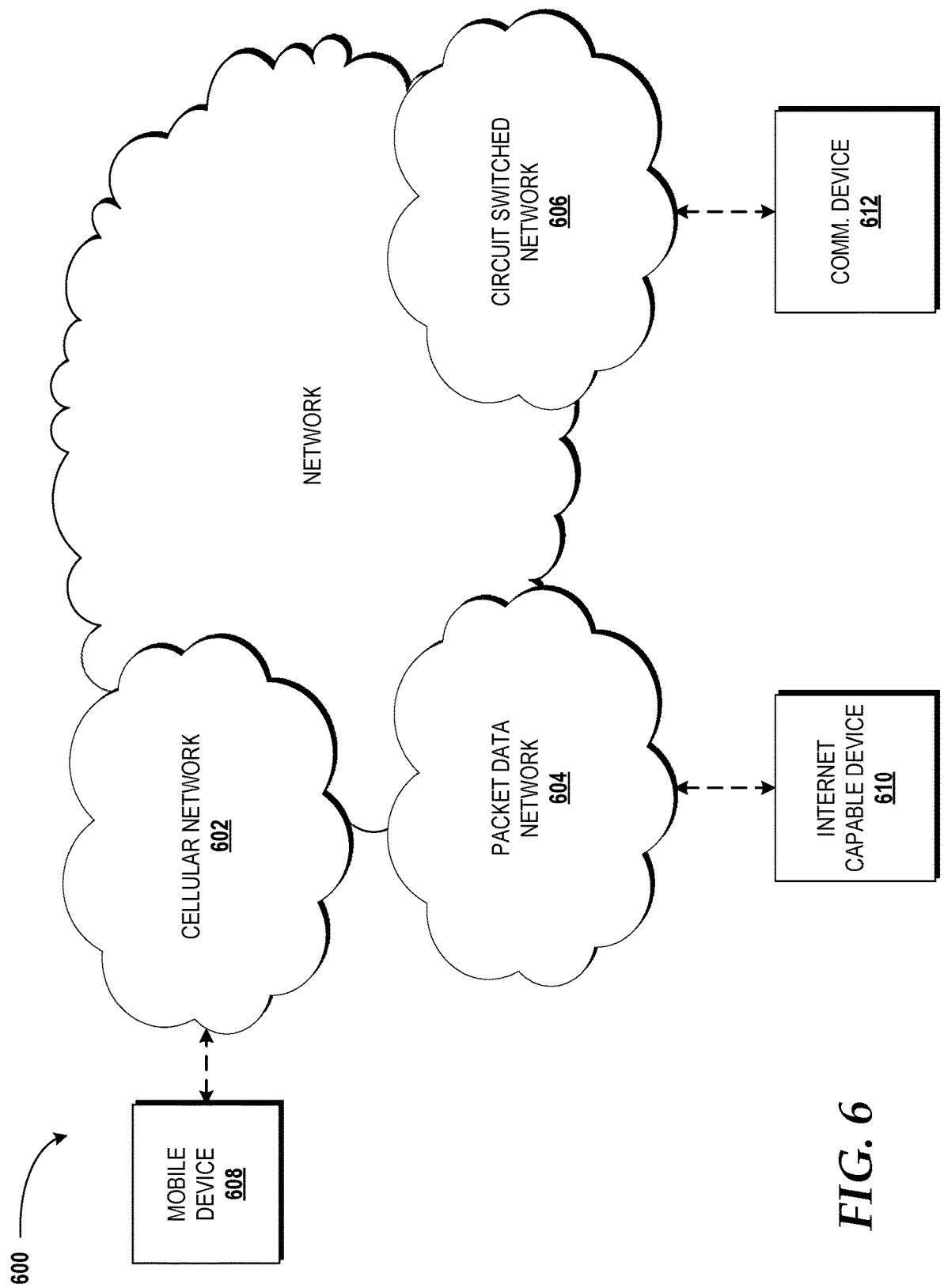
FIG. 6 is a diagram illustrating a network, according to an illustrative embodiment.

Turning now to FIG. 6, details of a network 600 are illustrated, according to an illustrative embodiment. In some embodiments, the network 600 includes the network 102. The network 600 includes a cellular network 602, a packet data network 604, for example, the Internet, and a circuit switched network 606, for example, a PSTN. The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the IP calling device 114, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a POTS. The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, the IP calling device 114, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network is used to refer broadly to any combination of the networks 602, 604, 606 shown in FIG. 6 and/or the network 102. It should be appreciated that substantially all of the functionality described with reference to the network 102 can be performed by the cellular network 602, the packet data network 604, and/or the circuit switched network 606, alone or in combination with other networks, network elements, and the like.

Based on the foregoing, it should be appreciated that concepts and technologies directed to 9-1-1 call routing have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A provider edge router comprising:
   a plurality of outbound interfaces, wherein the plurality of outbound interfaces comprises a dedicated 9-1-1 outbound interface providing a dedicated 9-1-1 outbound link to a 9-1-1 edge router and further comprises at least one outbound interface to provider routers for routing non-9-1-1 calls;
   a processor; and
   a memory that stores instructions that, when executed by the processor, cause the processor of the provider edge router to perform operations comprising:
      receiving an Internet protocol call from an Internet protocol calling device, wherein the Internet protocol call is associated with a plurality of Internet protocol packets,
      determining that the Internet protocol call is associated with a 9-1-1 service,
      in response to determining that the Internet protocol call is associated with the 9-1-1 service, marking a differentiated services field of each of the plurality of Internet protocol packets of the Internet protocol call with a differentiated services code point, wherein the differentiated services code point identifies a level of service for the Internet protocol call as priority such that the plurality of Internet protocol packets associated with the Internet protocol call are prioritized for the 9-1-1 service, and wherein the 9-1-1 edge router provides access to one or more 9-1-1 endpoints associated with the 9-1-1 service, and
      routing, via the dedicated 9-1-1 outbound interface and the dedicated 9-1-1 outbound link, the plurality of Internet protocol packets associated with the Internet protocol call including the differentiated services code point to the 9-1-1 edge router that routes the Internet protocol call to one of the one or more 9-1-1 endpoints.

2. The provider edge router of claim 1, wherein the Internet protocol call comprises a session initiation protocol call.

3. The provider edge router of claim 1, wherein the dedicated 9-1-1 outbound interface is dedicated to the 9-1-1 edge router.

4. The provider edge router of claim 1, wherein the dedicated 9-1-1 outbound interface is dedicated to the 9-1-1 edge router and at least one other 9-1-1 edge router.

5. The provider edge router of claim 1, wherein the operations further comprise assigning a new subnet to the Internet protocol call in order to perform a network address translation function back to a source Internet protocol address of the Internet protocol call.

6. The provider edge router of claim 1, wherein the differentiated services code point of each of the plurality of Internet protocol packets of the Internet protocol call cannot be removed and cannot be manipulated by any router during routing of the Internet protocol call to the 9-1-1 edge router.

7. A computer-readable storage medium comprising computer-executable instructions that, when executed by a processor of a provider edge router, cause the provider edge router to perform operations comprising:
   receiving an Internet protocol call from an Internet protocol calling device, wherein the Internet protocol call is associated with a plurality of Internet protocol packets, wherein the provider edge router comprises a plurality of outbound interfaces, and wherein the plurality of outbound interfaces comprises a dedicated 9-1-1 outbound interface providing a dedicated 9-1-1 outbound link to a 9-1-1 edge router and further comprises at least one outbound interface to provider routers for routing non-9-1-1 calls;
   determining that the Internet protocol call is associated with a 9-1-1 service;
   in response to determining that the Internet protocol call is associated with the 9-1-1 service, marking a differentiated services field of each of the plurality of Internet protocol packets of the Internet protocol call with a differentiated services code point, wherein the differentiated services field identifies a level of service for the Internet protocol call as priority such that the plurality of Internet protocol packets associated with the Internet protocol call are prioritized for the 9-1-1 service, and wherein the 9-1-1 edge router provides access to one or more 9-1-1 endpoints associated with the 9-1-1 service; and
   routing, via the dedicated 9-1-1 outbound interface and the dedicated 9-1-1 outbound link, the plurality of Internet protocol packets associated with the Internet protocol call including the differentiated services code point to the 9-1-1 edge router that routes the Internet protocol call to one of the one or more 9-1-1 endpoints.

8. The computer-readable storage medium of claim 7, wherein the Internet protocol call comprises a session initiation protocol call.

9. The computer-readable storage medium of claim 7, wherein the dedicated 9-1-1 outbound interface is dedicated to the 9-1-1 edge router.

10. The computer-readable storage medium of claim 7, wherein the dedicated 9-1-1 outbound interface is dedicated to the 9-1-1 edge router and at least one other 9-1-1 edge router.

11. The computer-readable storage medium of claim 7, wherein the operations further comprise assigning a new subnet to the Internet protocol call in order to perform a network address translation function back to a source Internet protocol address of the Internet protocol call.

12. The computer-readable storage medium of claim 7, wherein the differentiated services code point of each of the plurality of Internet protocol packets of the Internet protocol call cannot be removed and cannot be manipulated by any router during routing of the Internet protocol call to the 9-1-1 edge router.

13. A method comprising:
- receiving, by a provider edge router, an Internet protocol call from an Internet protocol calling device, wherein the Internet protocol call is associated with a plurality of Internet protocol packets, wherein the provider edge router comprises a plurality of outbound interfaces, and wherein the plurality of outbound interfaces comprises a dedicated 9-1-1 outbound interface providing a dedicated 9-1-1 outbound link to a 9-1-1 edge router and further comprises at least one outbound interface to provider routers for routing non-9-1-1 calls;
- determining, by the provider edge router, that the Internet protocol call is associated with a 9-1-1 service;
- in response to determining that the Internet protocol call is associated with the 9-1-1 service, marking, by the provider edge router, a differentiated services field of each of the plurality of Internet protocol packets of the Internet protocol call with a differentiated services code point, wherein the differentiated services code point identifies a level of service for the Internet protocol call as priority such that the plurality of Internet protocol packets associated with the Internet protocol call are prioritized for the 9-1-1 service, and wherein the 9-1-1 edge router provides access to one or more 9-1-1 endpoints associated with the 9-1-1 service; and
- routing, by the provider edge router to the 9-1-1 edge router via the dedicated 9-1-1 outbound interface and the dedicated 9-1-1 outbound link, the plurality of Internet protocol packets associated with the Internet protocol call including the differentiated services code point to the 9-1-1 edge router that routes the Internet protocol call to one of the one or more 9-1-1 endpoints.

14. The method of claim 13, wherein receiving, by the provider edge router, the Internet protocol call comprises receiving a session initiation protocol call.

15. The method of claim 13, wherein the dedicated 9-1-1 outbound interface is dedicated to the 9-1-1 edge router.

16. The method of claim 13, further comprising assigning, by the provider edge router, a new subnet to the Internet protocol call in order to perform a network address translation function back to a source Internet protocol address of the Internet protocol call.

17. The method of claim 16, wherein the differentiated services code point of each of the plurality of Internet protocol packets of the Internet protocol call cannot be removed and cannot be manipulated by any router during routing of the Internet protocol call to the 9-1-1 edge router.

* * * * *